Dec. 8, 1970          R. J. POWERS          3,546,659
                      COUPLING DEVICE
Filed Jan. 14, 1969                      2 Sheets-Sheet 1

INVENTOR.
Richard J. Powers
BY
ATTORNEYS

Dec. 8, 1970   R. J. POWERS   3,546,659
COUPLING DEVICE
Filed Jan. 14, 1969   2 Sheets-Sheet 2
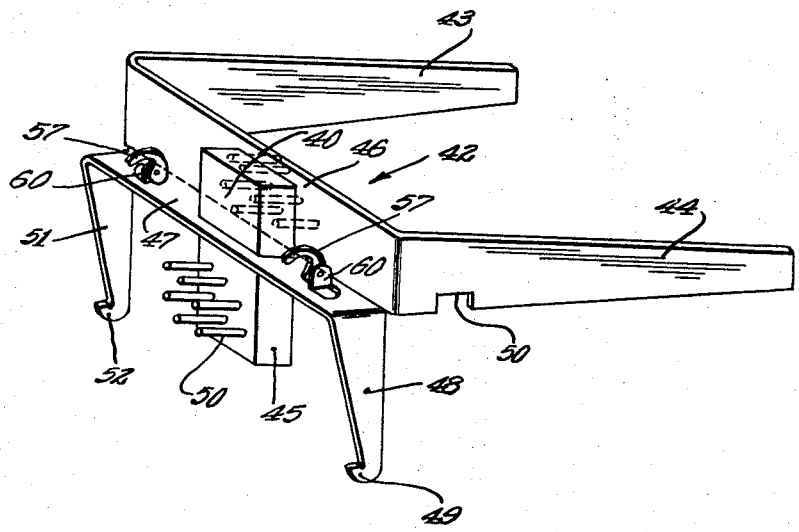
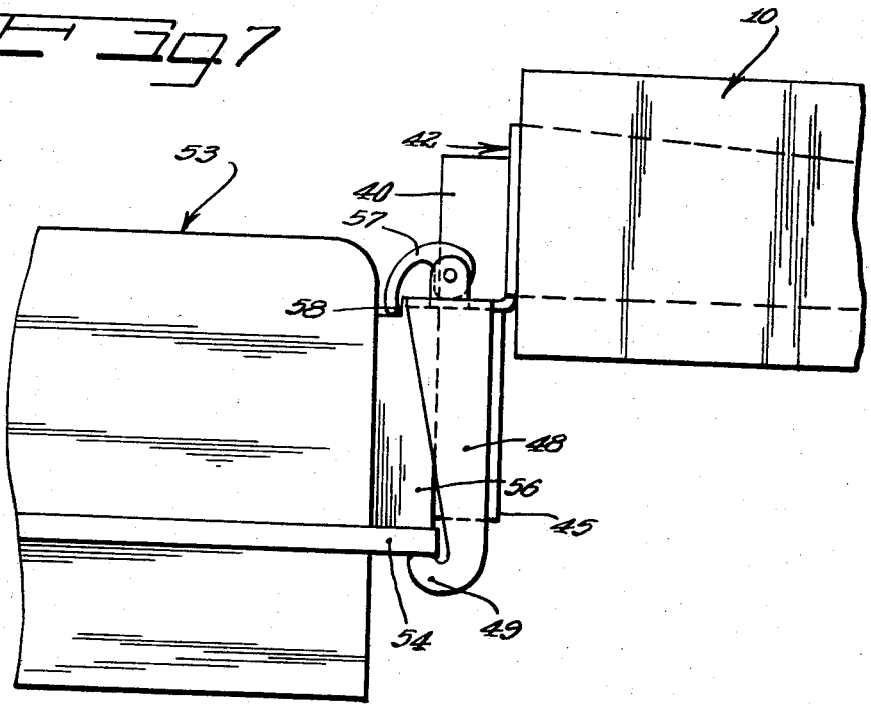
INVENTOR.
Richard J. Powers
BY Hill, Sherman, Meroni, Gross & Simpson ATTORNEYS

United States Patent Office 3,546,659
Patented Dec. 8, 1970

3,546,659
COUPLING DEVICE
Richard J. Powers, 40 E. Erie St.,
Elmhurst, Ill. 60126
Filed Jan. 14, 1969, Ser. No. 790,914
Int. Cl. H01r *13/54*
U.S. Cl. 339—91                                3 Claims

ABSTRACT OF THE DISCLOSURE

A coupling device for connecting associated pieces of electronic equipment so as to mechanically and electronically couple the equipment together and to perform any necessary mode switching. Attaching brackets extend into electronic equipment and allow mechanical and electrical connections to be made between a number of different units.

CROSS REFERENCES TO RELATED APPLICATION

This application is related to the application entitled "Tape Actuated Projector," Ser. No. 747,369, filed July 24, 1968 by Richard J. Powers, Cecil A. Broom and John C. Pangborn.

BACKGROUND OF THE INVENTION

Field of the invention

This invention relates, in general, to coupling devices for mechanically and electronically coupling equipments together and in particular the bracket switch might be used for connecting tape cueing and control equipment to photographic equipment.

Description of the prior art

It has oftentimes been necessary to connect a pair of equipments together and such connections have been made by running cables between the equipments. This oftentimes produces an awkward configuration. It is also at times necessary to mechanically connect two or more equipments together and it is at times awkward to directly connect equipments of different configurations together.

SUMMARY OF THE INVENTION

The present invention comprises coupling devices for mechanically and electronically coupling two or more equipments together so that a compact mechanical structure is formed and also an efficient and neat electrical connection is made between the units.

Certain configurations allow two or more tape machines to be connected together and/or two various camera equipments such as photographic slide projectors.

Other and further objects, features and advantages of the present invention will become apparent to those skilled in the art from the following detailed disclosure thereof and the drawings attached hereto and made a part hereof.

BRIEF DESCRIPTION OF THE DRAWINGS

FIG. 6 illustrates a modified bracket of the invention; and

FIG. 7 illustrates the bracket of FIG. 6 connected to a slide projector.

DESCRIPTION OF THE PREFERRED EMBODIMENTS

Figure 1:
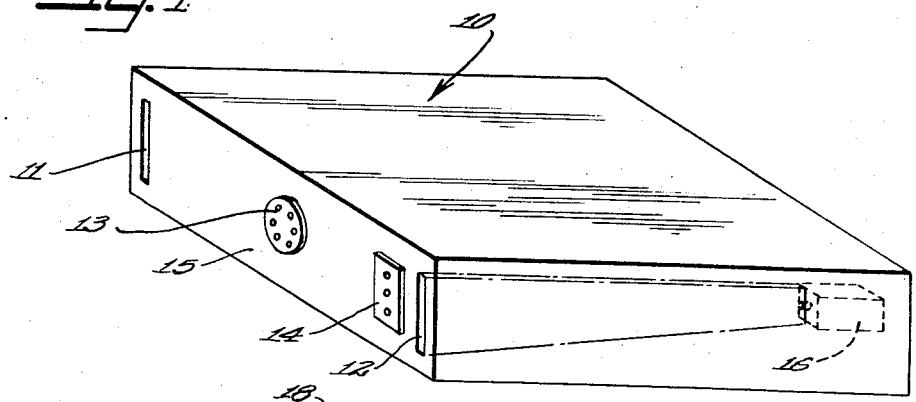
FIG. 1 illustrates an equipment into which the supporting and coupling bracket of this invention is to be received.
Figure 2:
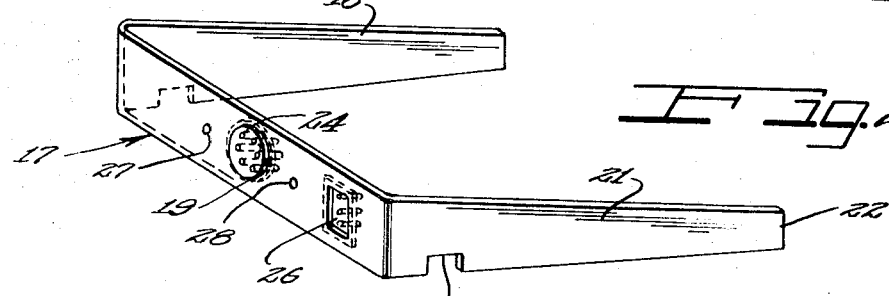
FIG. 2 illustrates a coupling bracket according to this invention.

FIG. 1 illustrates an electronic equipment 10 which is formed with slots 11 and 12 and which has electrical plugs 13 and 14 formed on its face 15. A switch 16 is mounted in the electronic equipment 10 in alignment with the slot 12.

An attaching bracket according to this invention 17 is formed with a pair of legs 18 and 21 which are connected at one end thereof by a center portion 19. The legs 18 and 21 may be inserted into the slots 11 and 12 and the end 22 may engage the actuator of the switch 16. Electrical sockets 24 and 26 are in alignment with the sockets 13 and 14 and make electrical connection therewith when the bracket 17 is inserted into the slots 11 and 12 of the equipment 10. Holes 27 and 28 are formed through the portion 19 of the bracket 17 to allow the bracket to be mechanically supported.

A notch 23 is formed in the lower edge of the leg 21 of the bracket 17 and is adapted to engage a switch (not shown) in the electronic equipment 10 to actuate it. Thus, means are provided for actuating the switch 16 or a second switch (not shown) by the notch 23 when the bracket 17 is inserted into the electronic equipment 10.

Figure 3:
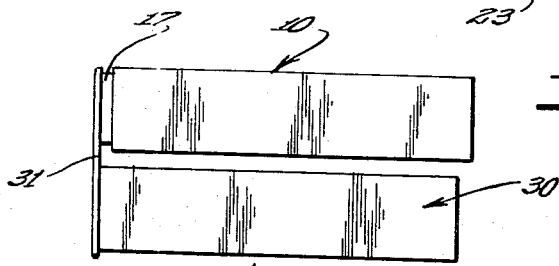
FIG. 3 illustrates a first configuration of the coupling bracket of this invention with a supporting base.

FIG. 3 illustrates the equipment 10 and bracket 17 in assembled relation with the bracket 17 connected to a supporting member 31. The bracket 17 may be attached to the supporting member 31 by bolts or other suitable holding means which pass through the openings 27 and 28 and connect the bracket to the holding member 31. Second electronic or mechanical equipment 30 may also be attached to the holding plate 31 and the electrical connections from the equipment 10 may pass through the sockets 13 and 14, the sockets 24 and 26 and down through a hollow portion of the supporting member 31 to the equipment 30. The arrangement shown in FIG. 3 allows the electronic equipment 10 to be efficiently and compactly supported by the bracket 17 and electrically connected to the equipment 30 through the supporting member 31.

Figure 4:
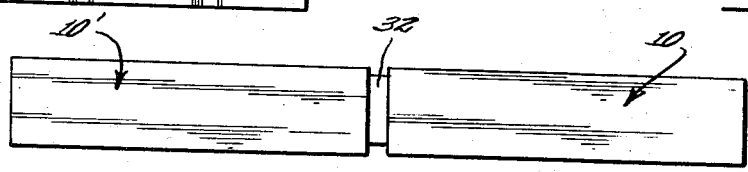
FIG. 4 illustrates a modification of the invention illustrating another arrangement of the bracket.
Figure 5:
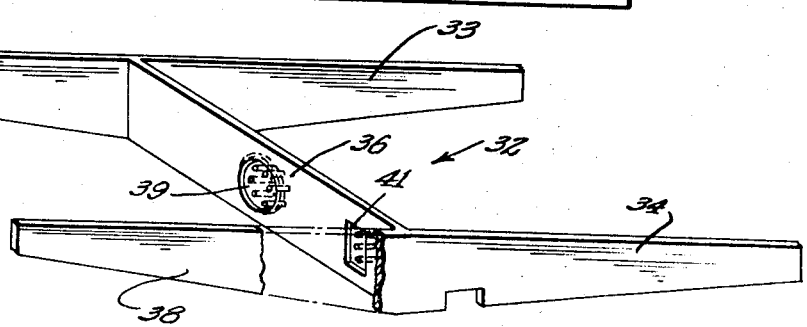
FIG. 5 illustrates the modified bracket of FIG. 4 in perspective.

A modification of the invention is illustrated in FIGS. 4 and 5 wherein a double bracket 32 formed with a first pair of legs 33 and 34 which extend from a center portion 36 in a first direction may receive thereon a first electronic equipment 10 which is provided with slots 11 and 12 as is the apparatus illustrated in FIG. 1. A second pair of supporting legs 37 and 38 extend from the center portions 36 in the opposite direction to legs 33 and 34 and a second electronic equipment 10' may be formed with openings for receiving the arms 37 and 38 therein. Electrical sockets 39 and 41 allow electrical connections to be made with aligned electrical sockets formed in the equipment 10 and 10'. Thus, in assembled relationship the equipments 10 and 10' are aligned as shown in FIG. 4.

FIGS. 6 and 7 illustrate another modification of the invention for connecting an electronic equipment 10 to a slide projector such as an Eastman Kodak Carousel projector. As shown in FIG. 6, a bracket 42 has a center portion 46 from which extend arms 43 and 44. Leg 44 is formed with a switch actuating slot 50 and the center portion 46 has an electrical plug 40 for mating with plugs in electronic equipment 10. A lower portion 45 of plug 40 has prongs 50 that are connectable to a Carousel projector.

A ledge portion 47 is connected to the center portion 46 and has a pair of downwardly extending attaching arms 48 and 51 formed with hooks 49 and 52 at their lower ends thereof.

FIG. 7 illustrates the bracket 42 supporting electronic equipment 10 on a slide projector 53. The slide projector 53 might be, for example, an Eastman Kodak type Carousel projector which is formed with a ledge 54 under which the hooks 49 and 52 may be received and has an extension with an upper portion 58 over which the ledge portion 47 of the bracket 42 may be received. The arms 48 and 51 extend downwardly on each side of the extension 58 and a pair of spring or cam operated latches 57 are mounted on edge 47 by brackets 60. The latches 57 engage the portion 58 of the Carousel and lock the bracket 42 to the unit.

The prongs 50 of plug 40 engage a mating plug of the Carousel unit to make electrical connections between the two units 10 and 53.

It is seen that this invention provides a coupling device for connecting asociated pieces of electronic equipment. It allows both mechanical and electrical connections to be made between equipments and may also perform necessary mode switching. Various electrical interconnections and terminations may be added if desired as well as various interlocks or indicators and the ones illustrated are for illustrative purposes only and are not to be considered as limiting the invention.

It will be understood that modifications and variations may be effected without departing from the spirit and scope of the novel concepts of the present invention.

I claim as my invention:

1. Means for mechanically and electrically coupling a plurality of equipments together comprising: a generally U-shaped bracket member formed with a center portion and having a pair of legs extending outwardly in the same direction which are adapted to engage and mechanically support one of said equipments, electrical connectors attached to said bracket and engageable with mating connectors of one of said equipments when said legs are engaged with said equipments and wherein said one of said equipments is formed with slots into which said legs extend and said bracket further comprises a horizontally extending ledge portion with downwardly extending arms attached to said U-shaped bracket, equipment engaging means at the lower ends of said arms, and locking means attached to said extending ledge to attach it to a second one of said equipments.

2. Means for mechanically and electrically coupling equipments together according to claim 1 wherein a second one of said equipments is formed with an extension and said second one of said equipments formed with a projection which the equipment engaging means engages, and said second one of said equipments formed with a depression adjacent said extension into which said locking means is receivable.

3. Means for mechanically and electrically coupling equipments together according to claim 2 wherein said locking means comprises a spring actuated latch engageable with said second one of said equipments.

References Cited

UNITED STATES PATENTS

| | | | |
|---|---|---|---|
| 2,691,724 | 10/1954 | Hoffman | 250—16 |
| 3,101,230 | 8/1963 | Bausch et al. | 339—91 |
| 3,268,685 | 8/1966 | Swanson | 200—61.62 |

MARVIN A. CHAMPION, Primary Examiner

J. H. McGLYNN, Assistant Examiner

U.S. Cl. X.R.

200—50.15; 317—101; 339—125

UNITED STATES PATENT OFFICE
CERTIFICATE OF CORRECTION

Patent No. 3,546,659          Dated  December 8, 1970

Inventor(s)   RICHARD J. POWERS

It is certified that error appears in the above-identified patent and that said Letters Patent are hereby corrected as shown below:

Column 4, line 14, "and said second one of said equipments" sho read --over which said ledge may be placed and--.

Signed and sealed this 10th day of August 1971.

(SEAL)
Attest:

EDWARD M. FLETCHER, JR.          WILLIAM E. SCHUYLER, JR.
Attesting Officer                Commissioner of Patents